(12) United States Patent
Jaker et al.

(10) Patent No.: US 10,361,436 B2
(45) Date of Patent: Jul. 23, 2019

(54) ELECTROCHEMICAL CELLS AND METHODS FOR MAKING SAME

(71) Applicants: Marc Jaker, Fridley, MN (US); Kim Jaker, Ladera Ranch, CA (US)

(72) Inventors: Marc Jaker, Fridley, MN (US); Kim Jaker, Ladera Ranch, CA (US)

( * ) Notice: Subject to any disclaimer, the term of this patent is extended or adjusted under 35 U.S.C. 154(b) by 0 days.

(21) Appl. No.: 15/832,156

(22) Filed: Dec. 5, 2017

(65) Prior Publication Data

US 2018/0159134 A1 Jun. 7, 2018

Related U.S. Application Data

(62) Division of application No. 15/437,722, filed on Feb. 21, 2017, now Pat. No. 9,893,361.

(Continued)

(51) Int. Cl.
*H01M 10/00* (2006.01)
*H01M 4/62* (2006.01)
(Continued)

(52) U.S. Cl.
CPC .......... *H01M 4/626* (2013.01); *H01G 9/0029* (2013.01); *H01G 9/012* (2013.01); *H01G 9/025* (2013.01); *H01G 9/0425* (2013.01); *H01G 9/08* (2013.01); *H01G 9/15* (2013.01); *H01G 11/30* (2013.01); *H01G 11/38* (2013.01); *H01G 11/62* (2013.01); *H01G 11/66* (2013.01); *H01G 11/78* (2013.01); *H01G 11/84* (2013.01); *H01G 11/86* (2013.01); *H01M 2/145* (2013.01); *H01M 4/0402* (2013.01); *H01M 4/0473* (2013.01); *H01M 4/622* (2013.01); *H01M 4/625* (2013.01);
(Continued)

(58) Field of Classification Search
CPC .. H01M 4/626; H01M 4/622; H01M 10/0525; H01M 8/1016; H01M 4/96; H01M 4/663; H01M 4/625; H01M 10/0585
See application file for complete search history.

(56) References Cited

U.S. PATENT DOCUMENTS

2002/0168574 A1* 11/2002 Ahn ...................... H01M 4/139
429/232
2007/0231704 A1 10/2007 Inda
(Continued)

OTHER PUBLICATIONS

USPTO; U.S. Restriction Requirement dated May 9, 2017 in U.S. Appl. No. 15/437,722.
(Continued)

*Primary Examiner* — Nicholas P D'Aniello
(74) *Attorney, Agent, or Firm* — Snell & Wilmer L.L.P.

(57) ABSTRACT

The present disclosure is directed to electrochemical cells having injection molded or 3D printed components, such as cathodes, anodes, and/or electrolytes, and methods for making such electrochemical cells. The cathodes, anodes, and/or electrolytes can be formed from a binder resin and various conductive and active materials, mixtures of which are injected into a mold under heat and pressure to form the components of the electrochemical cells. The cathode can include conductive metallic powder, flakes, ribbons, fibers, wires, and/or nanotubes. Further, electrochemical arrays can be formed from multiple electrochemical cells having injection molded or 3D printed components.

12 Claims, 15 Drawing Sheets

Related U.S. Application Data

(60) Provisional application No. 62/396,648, filed on Sep. 19, 2016.

(51) Int. Cl.

| | | |
|---|---|---|
| *H01G 9/00* | (2006.01) | |
| *H01G 9/012* | (2006.01) | |
| *H01G 9/025* | (2006.01) | |
| *H01G 9/042* | (2006.01) | |
| *H01G 9/08* | (2006.01) | |
| *H01G 9/15* | (2006.01) | |
| *H01M 4/66* | (2006.01) | |
| *H01M 4/96* | (2006.01) | |
| *H01M 8/1016* | (2016.01) | |
| *H01M 10/0562* | (2010.01) | |
| *H01M 10/0585* | (2010.01) | |
| *H01M 2/14* | (2006.01) | |
| *H01M 4/04* | (2006.01) | |
| *H01M 4/70* | (2006.01) | |
| *H01M 10/04* | (2006.01) | |
| *H01M 10/056* | (2010.01) | |
| *H01M 10/058* | (2010.01) | |
| *H01G 11/30* | (2013.01) | |
| *H01G 11/38* | (2013.01) | |
| *H01G 11/62* | (2013.01) | |
| *H01G 11/66* | (2013.01) | |
| *H01G 11/78* | (2013.01) | |
| *H01G 11/84* | (2013.01) | |
| *H01G 11/86* | (2013.01) | |
| *H01M 10/0525* | (2010.01) | |
| *H01M 2/16* | (2006.01) | |
| *H01M 4/75* | (2006.01) | |

(52) U.S. Cl.
CPC ........... *H01M 4/663* (2013.01); *H01M 4/666* (2013.01); *H01M 4/668* (2013.01); *H01M 4/70* (2013.01); *H01M 4/96* (2013.01); *H01M 8/1016* (2013.01); *H01M 10/049* (2013.01); *H01M 10/056* (2013.01); *H01M 10/058* (2013.01); *H01M 10/0562* (2013.01); *H01M 10/0585* (2013.01); *H01M 2/166* (2013.01); *H01M 4/0411* (2013.01); *H01M 4/0414* (2013.01); *H01M 4/0476* (2013.01); *H01M 4/0478* (2013.01); *H01M 4/75* (2013.01); *H01M 10/0525* (2013.01); *H01M 2300/0091* (2013.01)

(56) References Cited

U.S. PATENT DOCUMENTS

| | | | |
|---|---|---|---|
| 2008/0248335 A1* | 10/2008 | Kinoshita | H01M 10/0418 429/7 |
| 2014/0147742 A1 | 5/2014 | Anastas et al. | |
| 2015/0125757 A1 | 5/2015 | Kato et al. | |
| 2015/0333376 A1 | 11/2015 | Gaben | |
| 2016/0079589 A1 | 3/2016 | Ohara et al. | |

OTHER PUBLICATIONS

USPTO; Office Action dated Jul. 7, 2017 in U.S. Appl. No. 15/437,722.
USPTO; Examiner Interview Summary dated Oct. 25, 2017 in U.S. Appl. No. 15/437,722.
USPTO; Notice of Allowance dated Oct. 25, 2017 in U.S. Appl. No. 15/437,722.
USPTO; Corrected Notice of Allowance dated Dec. 22, 2017 in U.S. Appl. No. 15/437,722.
International Preliminary Report on Patentability in the International Application No. PCT/US2017/052327 dated Mar. 19, 2019.
International Search Report and Written Opinion in the International Application No. PCT/US2017/052327 dated Nov. 27, 2017.

* cited by examiner

ELECTROCHEMICAL CELLS AND METHODS FOR MAKING SAME

CROSS REFERENCE TO RELATED APPLICATION

This application is a divisional application of and claims priority to U.S. patent application Ser. No. 15/437,722, entitled "ELECTROCHEMICAL CELLS AND METHODS FOR MAKING SAME," which was filed Feb. 21, 2017 and which claims priority to U.S. Provisional Patent Application No. 62/396,648, entitled ELECTROCHEMICAL CELLS AND METHODS FOR MAKING SAME," which was filed Sep. 19, 2016. The aforementioned applications are hereby incorporated by reference herein in their entirety

FIELD

The present disclosure generally relates to methods of making electrochemical cells, and more particularly, to methods of forming electrochemical cells having molded electrodes and/or electrolytes.

BACKGROUND

Conventional electrical batteries, capacitors, and fuel cells are typically formed using stamped metal insert molding connectors and/or a layering process using several different material types, in several different forms (powder, liquid, solid), with no particular physical commonality. As such, conventional batteries may develop decreased charge capacity due to the separation of the anode and cathode from the electrolyte within the case of the battery.

As a conventional, solid state battery is charged and discharged, the anode and cathode can begin to separate from the electrolyte, creating voids between the interfaces of the electrodes and electrolyte. Air may enter these voids, causing separation of the electrodes from the electrolyte. This separation may reduce the efficiency and/or output of the battery.

As the use of batteries, capacitors and fuel cells to power devices increases, a need exists for more reliable and robust batteries, capacitors, and fuel cells that have an increased charge density and/or increased charging life. Further, conventional batteries may benefit from improved methods of manufacture that result in greater structural integrity against vibration and impact.

SUMMARY

The present disclosure includes methods for forming an electrochemical cell comprising injecting, via injection molding, a mixture of a binder resin, a cathode conductive material, and a cathode active material into a first cavity of a mold under heat and pressure to form a first cathode; injecting, via injection molding, a mixture of the binder resin and a first conductive material into a cavity within the first cathode under heat and pressure to form a cathode current collector and a cathode bus; injecting, via injection molding, a mixture of the binder resin and an anode conductive material into a second cavity of the mold under heat and pressure to form a first anode; injecting, via injection molding, a mixture of the binder resin and a second conductive material into a cavity within the first anode under heat and pressure to form an anode current collector and an anode bus; injecting, via injection molding, a mixture of the binder resin and an electrolytic material between the first anode and the first cathode under heat and pressure to form a first electrolyte; and forming a case surrounding at least a portion of the first cathode, the first anode, and the first electrolyte. The cathode material and the anode material can comprise at least one of styrene butadiene copolymer, polyvinylidene fluoride, polyurethane, polyvinylchloride, high density poly ethylene, polymethyl methacrylate, ethylene vinyl acetate, polyethylene oxide, low density polyethylene, and linear low density polyethylene. The cathode conductive material can comprise at least one of a metallic powder, a metallic flake, a metallic ribbon, a metallic fiber, a metallic wire, and a metallic nanotube, and can comprise between about 50 and 70 percent by volume. Further, the cathode conductive material can comprise a combination of lithium and at least one of cobalt, manganese, nickel-cobalt-manganese, and phosphate. The anode conductive material can comprise at least one of a graphite powder, a graphite fiber, and a carbon nanotube, and may be between about 75 and 85 percent by volume of the first anode. The electrolyte can comprise at least one of $LiBF_4$, $LiBF_6$, LSPS, $LiCoO_2$, $LiOHH_2O$, $Li_2CO_3$, and LiOH. The case can comprise a non-conductive thermoplastic material.

The present disclosure further includes an electrochemical cell comprising a first cathode comprising a thermoplastic cathode material having a cathode conductive material and a cathode active material suspended within the thermoplastic cathode material, wherein the cathode conductive material comprises between 50 and 70 percent by volume of the first cathode, a first anode comprising a thermoplastic anode material and an anode conductive material suspended within the thermoplastic anode material, wherein the anode conductive material comprises between 75 and 85 percent by volume of the first anode, a first electrolyte positioned between the first cathode and the first anode and comprising a thermoplastic electrolyte material and an electrolytic material, and a case surrounding at least a portion of the first cathode, a portion of the first anode, and a portion of the electrolyte. The cathode material and the anode material can comprise at least one of styrene butadiene copolymer, polyvinylidene fluoride, polyurethane, polyvinylchloride, high density poly ethylene, polymethyl methacrylate, ethylene vinyl acetate, polyethylene oxide, low density polyethylene, and linear low density polyethylene. The cathode conductive material can comprise at least one of a metallic powder, a metallic flake, a metallic ribbon, a metallic fiber, a metallic wire, and a metallic nanotube. Further, the cathode conductive material can comprise a combination of lithium and at least one of cobalt, manganese, nickel-cobalt-manganese, and phosphate. The anode conductive material can comprise at least one of a graphite powder, a graphite fiber, and a carbon nanotube. The electrolyte can comprise at least one of $LiBF_4$, $LiBF_6$, LSPS, $LiCoO_2$, $LiOHH_2O$, $Li_2CO_3$, and LiOH. The case can comprise a non-conductive thermoplastic material.

The present disclosure includes methods for forming an electrochemical cell comprising printing, via 3D printing, a first cathode from a cathode filament comprising a mixture of a binder resin, a cathode conductive material, and a cathode active material; printing, via 3D printing, a first anode from an anode filament comprising a mixture of the binder resin and an anode conductive material; printing, via 3D printing, a first electrolyte from an electrolyte filament comprising a mixture of the binder resin and an electrolytic material, wherein the first electrolyte is printed between the first anode and the first cathode; printing, via 3D printing, a cathode bus and a cathode current collector within the first cathode from a filament comprising a mixture of the binder resin and a conductive additive; printing, via 3D printing, an anode bus and an anode current collector within the first anode from the filament comprising a mixture of the binder resin and the conductive additive; and forming a case surrounding at least a portion of the first cathode, the first anode, and the first electrolyte. The cathode conductive material may comprise LiCoO2. The binder resin may comprise polyethylene oxide. The anode conductive material may comprise a carbon nanotube having a diameter of approximately 10-9 meters and an average length of approximately 1.5 micrometers. The conductive additive may comprise copper,

BRIEF DESCRIPTION OF THE DRAWINGS

The features and advantages of the present disclosure will become more apparent from the detailed description set forth below when taken in conjunction with the drawings, wherein.

DETAILED DESCRIPTION OF THE ILLUSTRATED EMBODIMENTS

Figure 1:
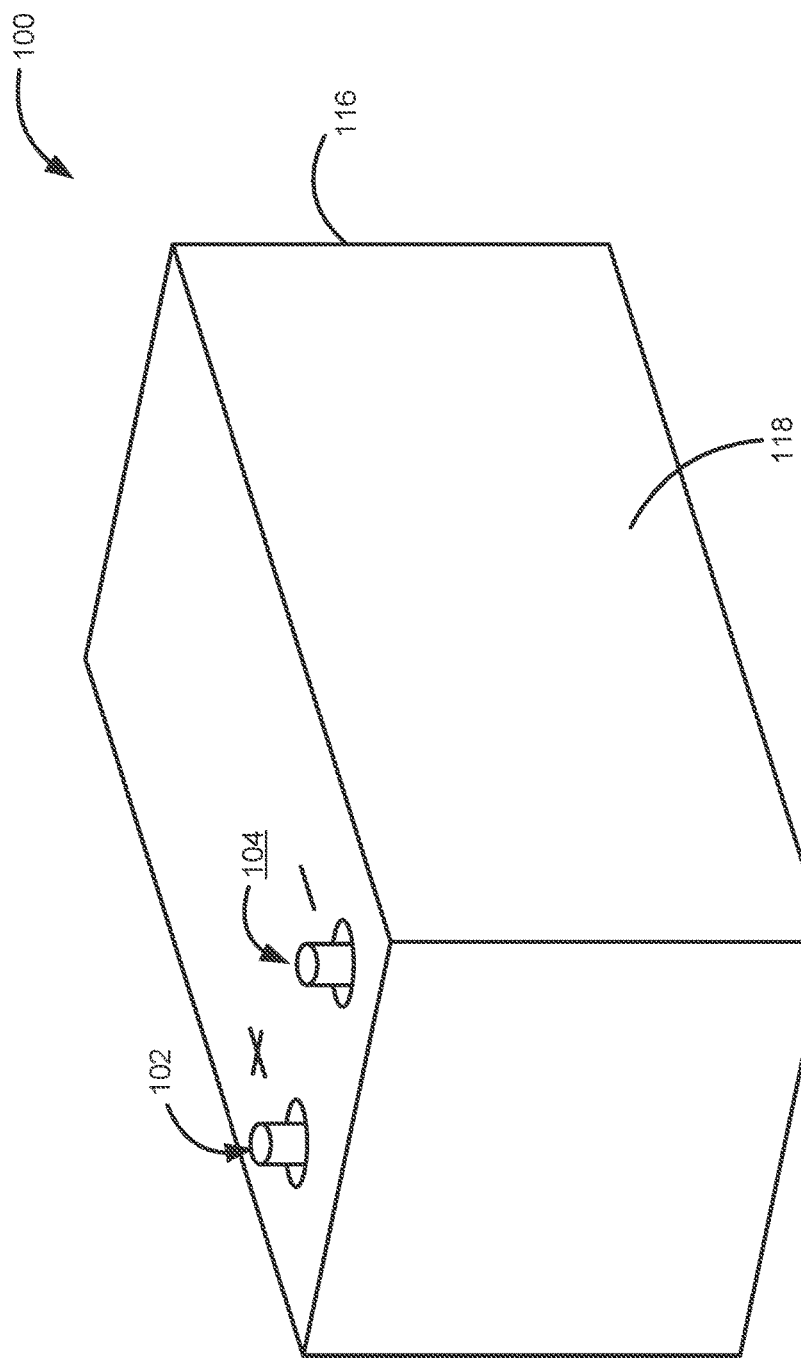
FIG. 1 illustrates a perspective view of an electrochemical cell in accordance with the present disclosure.

Persons skilled in the art will readily appreciate that various aspects of the present disclosure can be realized by any number of methods and articles configured to perform the intended functions. Stated differently, other methods and articles can be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure may be described in connection with various principles and beliefs, the present disclosure should not be bound by theory.

The term electrochemical cell refers, throughout the specification and in the claims, to a device capable of receiving, storing, and delivering electrical energy, and includes batteries, capacitors, and electric fuel cells.

The terms fuse and fusing refer, throughout the specification and in the claims, to the physical joining of two materials. For example, fusing can refer to the joining of polymeric materials through the application of heat and/or pressure.

In various embodiments, a method for forming an electrochemical cell comprises injecting at least one anode, at least one cathode, and at least one electrolyte into corresponding cavities within a mold. For example, an electrochemical cell in accordance with the present disclosure can be formed by injecting an anode, a cathode, and an electrolyte into their corresponding cavities within the mold under heat and pressure in a multi-step injection process. Further, such methods can be utilized to form arrays of electrochemical cells to produce a battery or capacitor "pack" or assembly. In such embodiments, a plurality of anodes, cathodes, and electrolytes is injected into a plurality of corresponding cavities within a single mold. Such configurations may provide a plurality of individual electrochemical cells that are electronically coupled to each other and share a single outer case or wall, eliminating the double wall associated with conventional battery or capacitor packs. Further, such electrochemical arrays may replace collections of individual batteries which are wired together to provide a desired current and voltage. For example, electrochemical arrays in accordance with the present disclosure may replace rechargeable battery packs such as those used by consumer electronic devices (e.g., laptop computers, tablet computers, and cellular phones), "cordless" tools (e.g., drills, various saws, high-powered flashlights), and uninterrupted power supplies, among other applications.

For example, with initial reference to FIG. 1, an electrochemical cell 100 (also called a sealed battery 100) comprises an anode 104, a cathode 102, and an electrolyte 118 housed within a case 116. In various embodiments, multiple components of electrochemical cell 100, including one of more of the anode 104, cathode 102, electrolyte 118, and case 116 (among others, which will be described in further detail) may comprise the same polymeric material. In such embodiments, electrochemical cell 100 may exhibit particular benefits, including increased structural integrity and/or improved resistance to vibration and force, among other benefits.

Figure 2:
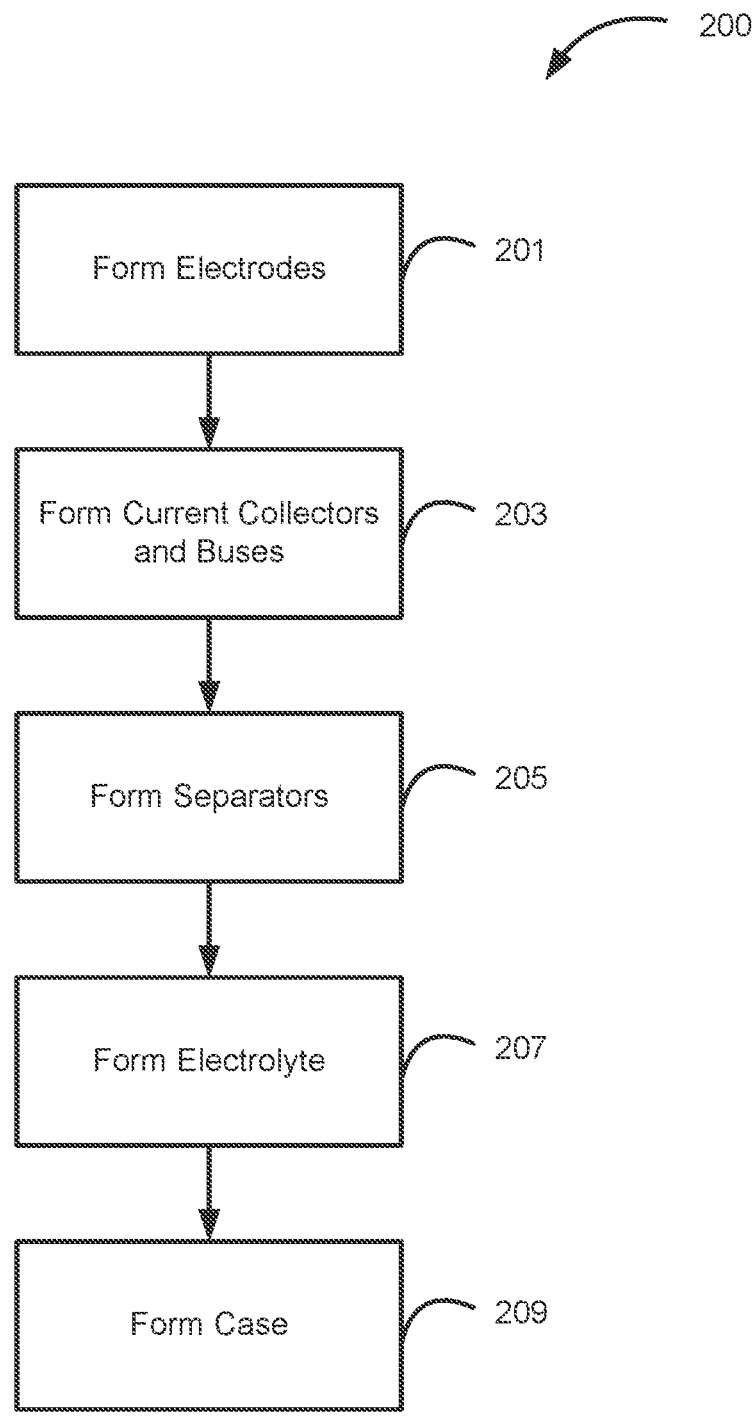
FIG. 2 illustrates a method of forming an electrochemical cell in accordance with the present disclosure.

With initial reference to FIG. 2, a method 200 for making an electrochemical cell (such as electrochemical cell 100 of FIG. 1) is illustrated. In various embodiments, method 200 comprises a step 201 of forming electrodes. For example, with initial reference to FIG. 3A, cathode 102 and/or anode 104 can be formed in step 201.

In various embodiments, cathode 102 can be injected into a cathode cavity within a mold. Cathode 102 can comprise, for example, a cathode conductive material contained within a cathode material. For example, cathode 102 can comprise a cathode conductive material homogenously or heterogeneously mixed within the cathode material. In various embodiments, cathode 102 comprises a suspension of cathode conductive material within the solid cathode material. Further, in various embodiments, cathode 102 may comprise a cathode active material. For example, the cathode active material may also be distributed throughout the cathode material (similarly to the cathode conductive material). Unlike conventional cathodes comprising a single metal conductive element or member, cathode 102 comprises cathode conductive material and cathode active material distributed throughout the cathode material.

In various embodiments, the cathode material of cathode 102 can comprise a non-conductive material. For example, the non-conductive material may comprise a polymeric material, such as a thermoplastic polymer or a thermoset polymer. For example, the cathode material can comprise one or more of styrene butadiene copolymer, polyvinylidene fluoride, polyurethane, polyvinylchloride, high density polyethylene, polymethyl methacrylate, ethylene vinyl acetate, polyethylene oxide, low density polyethylene, and linear low density polyethylene, among other polymeric materials. In various embodiments, the cathode material (also called a "binder" or "binder resin") can be in a powder or particulate form. For example, a powder or particulate form may allow the cathode material to be mixed with other materials, such as a suitable cathode conductive material and/or a cathode active material, prior to inclusion within electrochemical cell 100. In other embodiments, the cathode material may comprise a liquid into which the cathode conductive material and/or cathode active material can be mixed prior to injection into the mold.

Various cathode conductive materials can be used to form cathode 102. In various embodiments, suitable cathode conductive materials comprise one or more conductive particles or powders, such as a metallic powder, a metallic flake, a metallic ribbon, a metallic fiber, a metallic wire, and a metallic nanotube. For example, the cathode conductive material can comprise flakes having thickness between about 0.0001 inch and about 0.01 inch, and can comprise rectangular shapes having dimensions of between about 0.01 inch and 0.5 inch. Further, the cathode conductive material can comprise wires, fibers, or ribbons having a diameter between about 0.001 inch and 0.2 inch, and a length of about 0.01 inch to about 0.15 inch. Such wires, ribbons, or ribbons may have curved, bent, spiral, or otherwise non-straight configurations.

The cathode conductive material can comprise, for example, pre- or post-consumer recycled material. For example, the cathode conductive material can comprise recycled metal material that is mechanically reduced to the desired size and geometry. In other embodiments, the cathode conductive material may comprise "fresh," or non-recycled, material. The powder or particulates of the conductive material can be mixed with the powder or particulates of the cathode material to form the material of cathode 102 (prior to, and in preparation for, the injection of cathode 102 into the cathode cavity of the mold). In various embodiments, the cathode conductive material becomes suspended within the cathode material, forming cathode 102.

In various embodiments, the cathode conductive material can comprise, for example, lithium and at least one of cobalt, manganese, nickel-cobalt-manganese, and phosphate. The use of any suitable cathode conductive material is within the scope of the present disclosure. For example, further suitable cathode conductive materials include iron, copper, aluminum, nickel, silver, zinc, gold, and palladium. In various embodiments, the cathode conductive material may comprise between about 50% by volume and about 70% by volume of cathode 102.

The cathode active material of cathode 102 can comprise, for example, graphite. In various embodiments, the cathode active material comprises graphite between 10% by volume and 30% by volume, and further, between 15% by volume and 25% by volume of cathode 102.

Step 201 can comprise, for example, injecting cathode 102 into a cathode cavity within the mold by injection molding. In various embodiments, a suitable cathode material, cathode conductive material, and cathode active material are mixed together. The mixture of the materials is then injected into the cathode cavity of the mold via injection molding, under heat and pressure. For example, the cathode material, cathode conductive material, and cathode active material can be injected at between about 700 psi and about 45,000 psi and further, between about 5,000 psi and 23,000 psi, and between about 300° F. and about 650° F. However, any suitable conditions for injecting cathode 102 into the mold are within the scope of the present disclosure.

In various embodiments, step 201 further comprises forming anode 104. For example, similarly to cathode 102, anode can comprise an anode conductive material contained within an anode material. For example, anode 104 can comprise a conductive material homogenously or heterogeneously mixed within the anode material. In various embodiments, anode 104 comprises a suspension of solid anode conductive material within a solid anode material, which is injected into an anode cavity within the mold.

In various embodiments, the anode material of anode 104 can comprise a non-conductive material. For example, the anode material can comprise a polymer, such as a thermoplastic polymer or a thermoset polymer. Similar to the cathode material, the anode material can comprise one or more of styrene butadiene copolymer, polyvinylidene fluoride, polyurethane, polyvinylchloride, high density polyethylene, polymethyl methacrylate, ethylene vinyl acetate, polyethylene oxide, low density polyethylene, and linear low density polyethylene, among other polymeric materials. In various embodiments, the anode material (also called a "binder" or "binder resin") can be in a powder or particulate form. In one example, a powder or particulate form may allow the anode material to be mixed with other materials, such as the anode conductive material. Other suitable anode materials or cathode materials can comprise epoxy, nylon, acetyl, polycarbonate, and acrylic materials.

In various embodiments, the anode conductive material can comprise one or more of a graphite powder, a graphite flake, a graphite fiber, and a carbon nanotube. For example, the anode conductive material can comprise flakes having thickness between about 0.0001 inch and about 0.01 inch, and can comprise rectangular shapes having dimensions of between about 0.01 inch and 0.5 inch. Further, the anode conductive material can comprise wires, fibers, or ribbons having a diameter between about 0.001 inch and 0.2 inch, and a length of about 0.01 inch to about 0.15 inch. In various embodiments, the anode conductive material can comprise carbon nanotubes having a diameter of approximately $10^{-9}$ meters and an average length of approximately 1.5 micrometers. Although described with reference to specific carbon-based conductive materials and specific geometries, the use of any suitable anode conductive material is within the scope of the present disclosure.

Although described with reference to specific cathode conductive materials and anode conductive materials, any suitable pairing of cathode conductive material and anode conductive material having a non-zero electrochemical potential is within the scope of the present disclosure. Stated another way, electrochemical cells of the present disclosure can include any suitable chemistry, and are not limited to lithium ion batteries. For example, cathode conductive materials can include ferrate, iron oxide, cuprous oxide, iodate, metallic oxides (cuprous, cupric, mercuric, cobaltic, manganese dioxide, lead dioxide, silver, nickel dioxide, silver peroxide), oxygen, permanganate, and bromate. These cathode conductive materials can be used with anode conductive materials such as lithium, manganese, aluminum, zinc, chromium, iron, nickel, tin, lead, hydrogen, copper, silver, palladium, mercury, platinum, and gold.

In various embodiments, the anode conductive material may comprise between about 50% by volume and about 90% by volume of anode 104, and further, between about 75% by volume and 85% by volume of anode 104.

Cathode 102 and/or anode 104 can comprise a textured interface. For example, cathode 102 and/or anode 104 can be formed such that the interface between the electrodes and electrolyte 118 is non-smooth, rough, jagged, or the like, which may allow for increased surface interface between the electrodes and electrolyte 118. In various embodiments, cathode 102 and/or anode 104 comprise a textured surface formed by manipulating the heat under which the electrode is injected. For example, reducing the heat supplied during injection of cathode 102 and/or anode 104 (such as, for example, during step 201 of method 200) may cause particulates of cathode conductive material and/or anode conductive material to migrate towards one surface of the cathode 102 and/or anode 104, creating a textured surface. In other embodiments, texture can be imparted on a surface of cathode 102 and/or anode 104 by the mold itself. Such textures can be formed, for example, by stippling, sand blasting, or other physical treatment of one or more surfaces of the mold, which in turn, imparts a texture to the corresponding surfaces of the cathode 102 and/or anode 104.

Figure 3A:
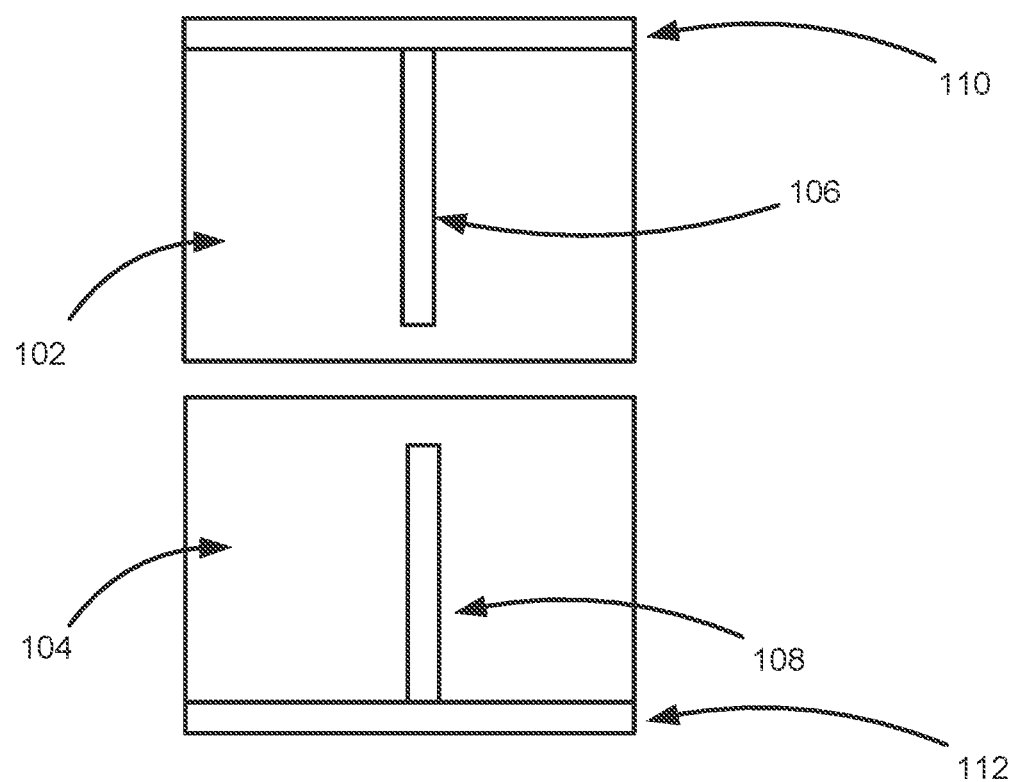
FIG. 3A illustrates a cross-sectional view of a partially-formed electrochemical cell in accordance with the present disclosure.

In various embodiments, method 200 further comprises a form current collectors and current buses step 203. With reference to FIGS. 2 and 3A, step 203 can comprise, for example, forming a cathode collector 106 and cathode bus 110. In various embodiments, cathode collector 106 and cathode bus 110 are made of conductive materials mixed into a non-conductive material (such as a binder or a resin). For example, cathode collector 106 and cathode bus 110 can comprise one or more of copper, aluminum, and other metallic materials mixed with a non-conductive material. Cathode collector 106 can comprise a channel within cathode 102 comprising conductive material (such as conductive powder, flakes, foil, and fibers) mixed with the non-conductive material. The non-conductive material can comprise one or more resins, such as PVC, PE, PEO, and acrylic. In various embodiments, the non-conductive material comprises the same material as at least one of the anode material, the cathode material, and the electrolyte material. Further, the conductive material can comprise the same material as the cathode conductive material of cathode 102.

Cathode collector 106 and cathode bus 110 can be injected into corresponding cavities within the mold. In an embodiment, cathode collector 106 and cathode bus 110 are injected into the mold simultaneously with cathode 102, anode 104, and/or electrolyte 118. In other embodiments, cathode collector 106 and/or cathode bus 110 are injected into the mold before or after cathode 102, anode 104, and/or electrolyte 118.

Further, step 203 can comprise forming an anode collector 108 and an anode bus 112. In various embodiments, the anode collector 108 and anode bus 112 are made of conductive materials mixed into a binder. For example, anode collector 108 and anode bus 112 can comprise one or more of graphite flakes, powders, fibers, and carbon nanotubes. In one embodiment, anode collector 108 and anode bus 112 are injected into the mold simultaneously with cathode collector 106 and/or cathode bus 110. In other embodiments, anode collector 108 and/or anode bus 112 are injected into the mold before or after cathode 102, anode 104, and/or electrolyte 118. Any suitable order of forming components of electrochemical cell 100 is within the scope of the present disclosure.

Similar to cathode 102 and anode 104, cathode collector 106 and/or anode collector 108 can comprise one or more textured surfaces. As previously described, textured surfaces can be produced by manipulating the heat supplied during the injection process, and/or imparted by the mold itself.

Figure 3B:
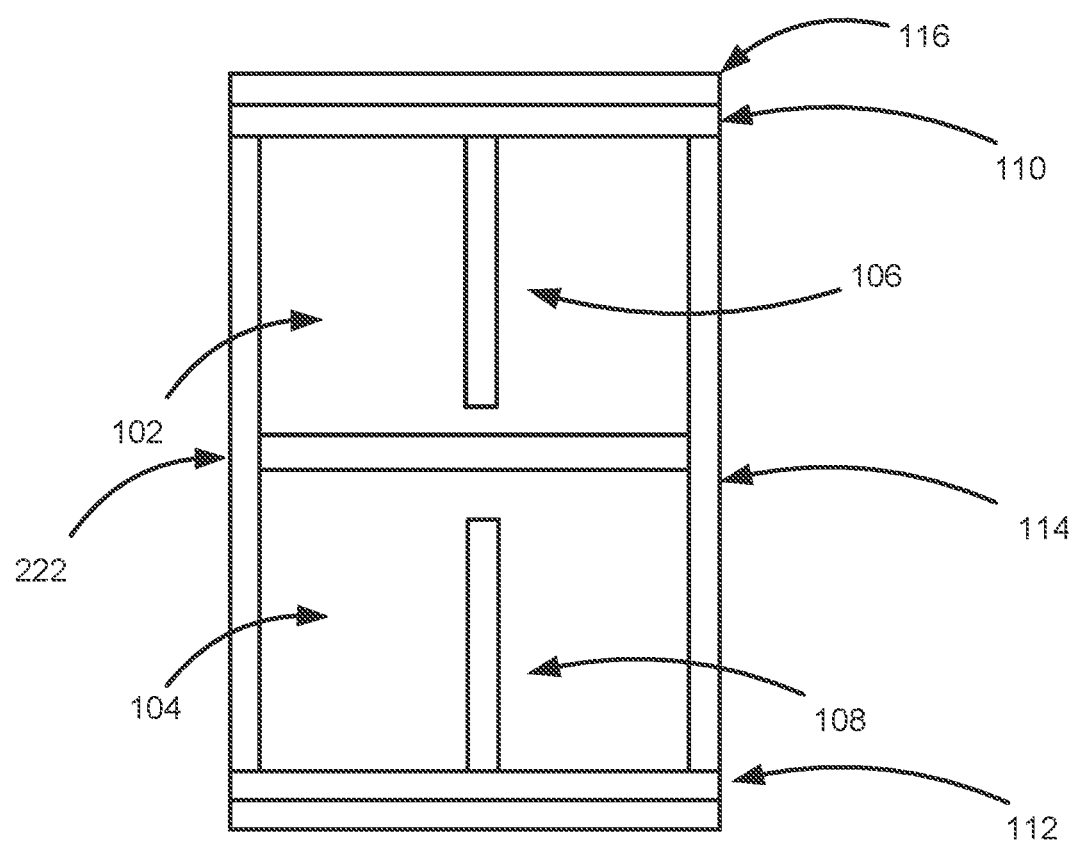
FIG. 3B illustrates another cross-sectional view of the partially-formed electrochemical cell of FIG. 3A, in accordance with the present disclosure.

In various embodiments, method 200 comprises a form separators step 205. For example, step 205 can comprise forming one or more separators 114. With reference to FIGS. 2 and 3B, separators 114 can surround and provide insulation and/or electrical isolation of at least a portion of cathode 102, anode 104, or electrolyte 118. Separators 114 can completely surround cathode 102 and anode 104 to form a sealed electrochemical cell 100. Further, separators 114 can be formed from any suitable non-conductive material, such as plastic or a coated or insulated metal. In various embodiments, separators 114 are formed by injecting a polymeric material into corresponding cavities within the mold. The polymeric material of separators 114 can comprise, for example, the same material as at least one of the anode material, the cathode material, and the electrolyte material. Further, separators 114 can comprise an insulating additive. For example, glass, ceramic, silicones, or other insulating material can be added to the polymeric material of separators 114 to improve electrical insulation. Further, separators 114 can comprise one or more openings 222. Openings 222 may provide fluid communication to an electrolyte cavity.

Method 200 can comprise, for example, a step 207 of forming an electrolyte. In various embodiments, step 207 comprises injecting an electrolyte 118 into one or more electrolyte cavities within a mold. For example, electrolyte 118 can be injected through openings 222 and into the electrolyte cavity. After the injection of electrolyte 118, openings 222 can be sealed.

In various embodiments, various steps of method 200 can be performed concurrently. For example, one or more electrodes (i.e., cathode 102 and/or anode 104) can be formed simultaneously with their corresponding current collectors and buses (i.e., cathode current collector 106 and cathode bus 110, and/or anode current collector 108 and anode bus 112, respectively). Stated another way, at least a portion of step 201 can be performed concurrently with at least a portion of step 203.

Although described with specific reference to method 200, the components of electrochemical cell 100 can be formed in various different orders. For example, cathode 102, anode 104, and electrolyte 118 can be injected into the cavities of the mold in various different orders. In various embodiments, cathode 102 and anode 104 can be injected into their respective cavities simultaneously, followed by the injection of electrolyte 118 into the electrolyte cavity (as illustrated in method 200). In other embodiments, electrolyte 118 can first be injected into the electrolyte cavity, followed by the injection of cathode 102 and/or anode 104 into their respective cavities. However, any order of forming cathode 102, anode 104, and electrolyte 118 within the mold is within the scope of the present disclosure.

Similar to cathode 102 and anode 104, electrolyte 118 can comprise an electrolyte material and an electrolytic material. For example, the electrolyte material of electrolyte 118 can comprise one or more of styrene butadiene copolymer, polyvinylidene fluoride, polyurethane, polyvinylchloride, high density polyethylene, polymethyl methacrylate, ethylene vinyl acetate, polyethylene oxide, low density polyethylene, and linear low density polyethylene, among other polymeric materials. In various embodiments, two or more of the anode material, cathode material, and electrolyte material comprise, as at least one ingredient in their respective materials, the same non-conductive material. While not intending to be bound by any particular theory, utilizing the same non-conductive material as a common ingredient for the various components (anode, cathode, and electrolyte) may allow for fusion between the different components, which in turn may reduce voids and/or air trapped between the interfaces of the components.

For example, in one embodiment anode 104 and electrolyte 118 are fused by the application of heat and/or pressure after injection of anode 104 and electrolyte 118 into the mold. In another embodiment, cathode 102 and electrolyte 118 are fused by the application of heat and/or pressure after injection of cathode 102 and electrolyte 118 into the mold. In another embodiment, anode 104 and electrolyte 118 are fused and cathode 102 and electrolyte 118 are fused.

Fusion of one or more of the electrodes (e.g., cathode 102 and/or anode 104) and electrolyte 118 may promote molecular bonding between the components, reducing or eliminating the interface between the components. For example, heat can be applied to electrochemical cell 100 after formation, causing many or all of the components of the cell to fuse together. Fusion may reduce the number of gaps and/or amount of air trapped between the various components, which in turn may improve charge cycle life of the electrochemical cell. In various embodiments, electrochemical cell 100 comprises a continuous, boundary-less, interface-less, or homogeneous polymeric material, wherein the various components (cathode 102, anode 104, electrolyte 118, etc.) comprise additional materials (such as conductive materials or active materials) added to the polymeric material and maintained in a desired configuration and geometry. Further, electrochemical cell 100 can be formed without the use of adhesives or compression to join the various components together and/or to facilitate ion transfer across the interfaces of the various components.

The electrolyte material of electrolyte 118 can be chosen to perform in a particular environment. For example, electrochemical cell 100 can be designed to operate in conditions such as high or low heat conditions, high impact, high vibration, or military conditions. Therefore, an electrolyte material capable of performing as desired under particular conditions can be selected. In various embodiments, the electrolytic material of electrolyte 118 can comprise, for example, one or more of $LiBF_4$, $LiBF_6$, LSPS, $LiCoO_2$, $LiOHH_2O$, $Li_2CO_3$, and LiOH.

In various embodiments, one or more of cathode 102, anode 104, and electrolyte 118 can be formed as premanufactured components, and assembled within electrochemical cell 100. For example, cathode 102 can be formed in an injection mold and removed for assembly with other components of electrochemical cell 100. In such embodiments, after assembling the components into electrochemical cell 100, the components can be subjected to heat and pressure, allowing the interfaces to partially or fully fuse together.

In yet further embodiments, one or more of cathode 102, anode 104, and electrolyte 118 can be extruded or pultruded into an initial profile (e.g., rods, sheets, or bars) and machined to a desired shape and configuration. After formation of the component, it can be assembled, along with the remaining components, within electrochemical cell 100.

Electrodes such as cathode 102 and/or anode 104 can also be formed, for example, by molding the mixture of material around a conductive element. For example, cathode 102 can be formed by molding a mixture of cathode material (e.g., polymeric material), cathode conductive material, and/or cathode active material around a conductive element. The conductive element can comprise a metallic element, such as a strip, rod, or other physical shape and configuration. Anode 104 can be similarly formed, by molding a mixture of anode material (e.g., polymeric material) and anode conductive material around a conductive element, such as a carbon or graphite strip, rod, or other physical form.

Figure 3C:
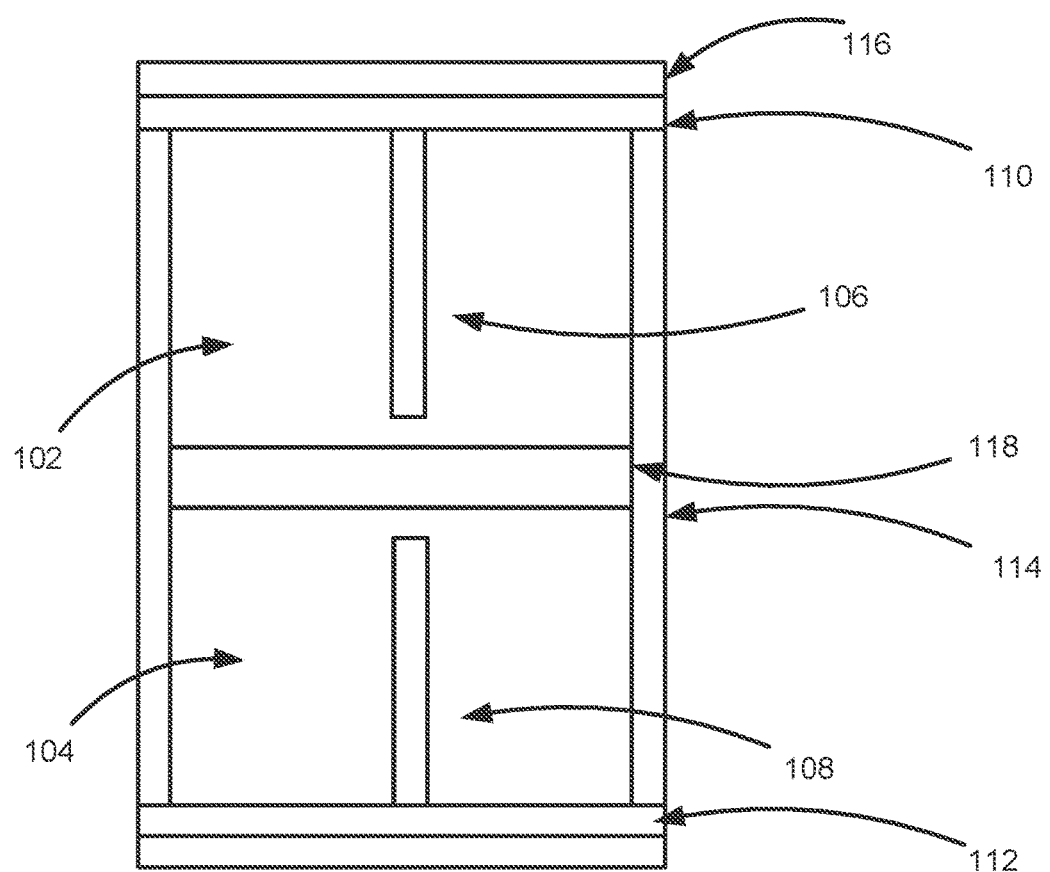
FIG. 3C illustrates another cross-sectional view of another the partially-formed electrochemical cell of FIGS. 3A and 3B, in accordance with the present disclosure.

In various embodiments, method 200 comprises a step 209 of forming a case (also called a "housing"). With initial reference to FIG. 3C, a case 116 can surround and insulate at least a portion of electrochemical cell 100. For example, case 116 can be injected into the mold before, after, or concurrently with the injection of other components of electrochemical cell 100. Similar to separators 114, case 116 can comprise any suitable non-conductive material, such as a plastic or a coated or insulated metal. For example, case 116 can comprise a polycarbonate, polysulfone, nylon, polyester, and a liquid crystal polymer. In various embodiments, case 116 comprises the same material as at least one of the anode material, the cathode material, and the electrolyte material.

Figure 4:
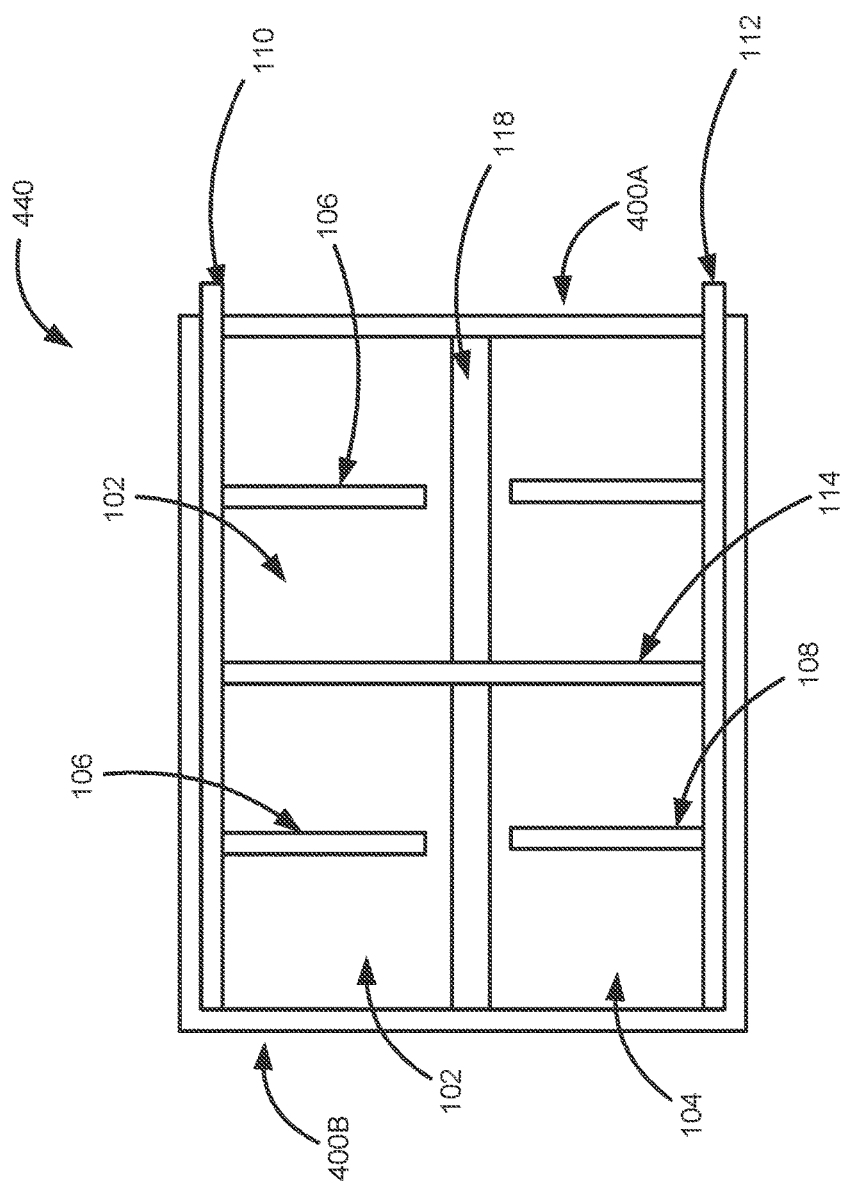
FIG. 4 illustrates a cross-sectional view of an electrochemical array in accordance with the present disclosure.

With initial reference to FIG. 4, an electrochemical array 440 can comprise multiple electrochemical cells, such as electrochemical cells 400A and 400B. An electrochemical array is defined as a plurality of electrochemical cells within a single housing or case. In various embodiments, cathodes 102 of electrochemical cells 400A and 400B can be in electrical continuity with each other through a single cathode bus 110. Further, anodes 104 of electrochemical cells 400A and 400B can be in electrical continuity with each other through a single anode bus 112. In various embodiments, each cell (400A and 400B) of electrochemical array 400 can be isolated from each other by separators 114.

Figure 5:
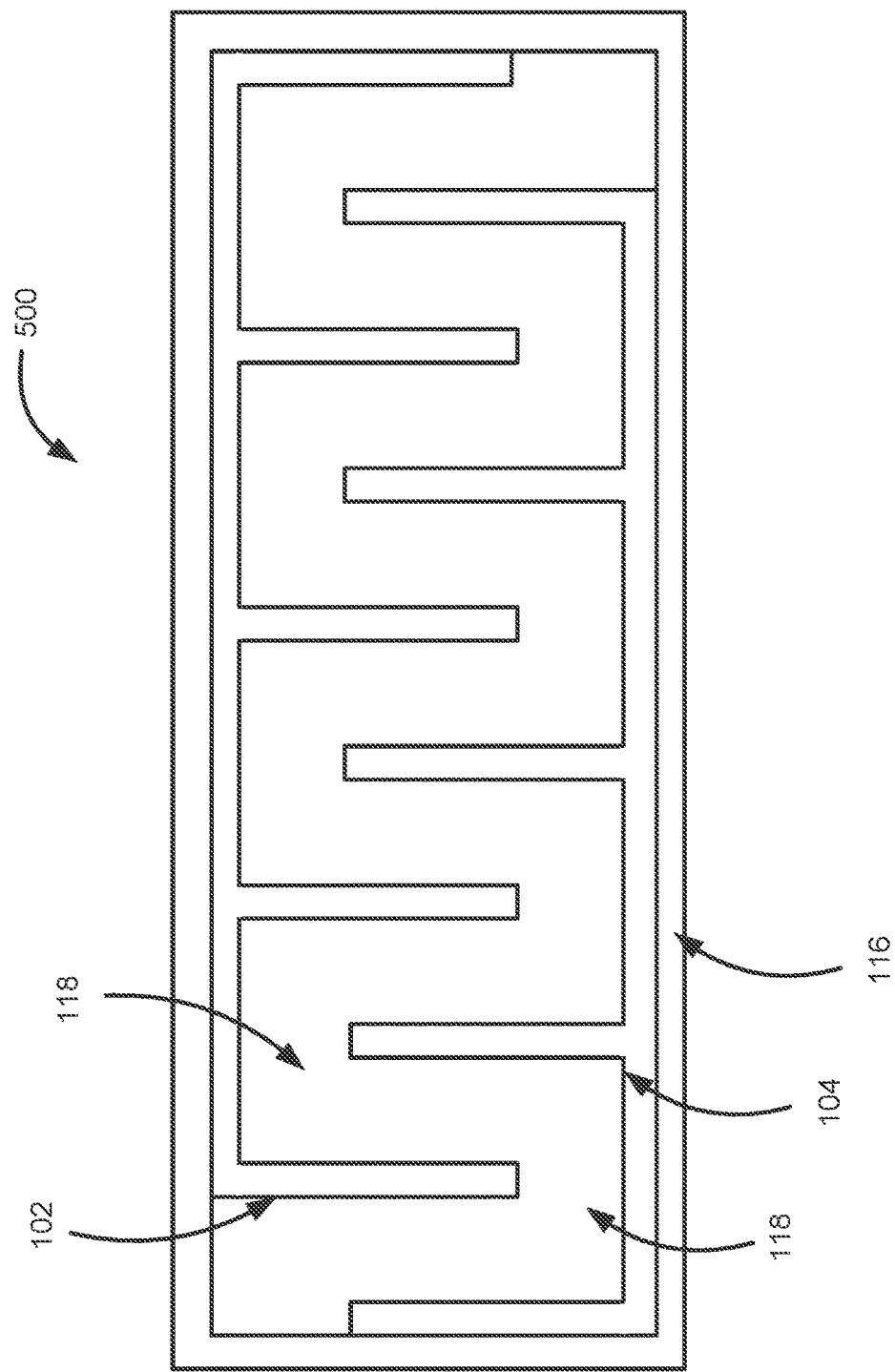
FIG. 5 illustrates a cross-sectional view of another electrochemical cell in accordance with the present disclosure.

With initial reference to FIG. 5, an electrochemical array 500 can also comprise a single cathode 102 having a number of cathode extensions 532, and a single anode 104 having a number of anode extensions 534. In various embodiments, cathode extensions 532 and anode extensions 534 alternate along a specific direction. Electrolyte 118 is injected in the cavity between the cathode extensions 532 and anode extensions 534. Electrochemical array 500 can further be surrounded by a case 116.

Figure 6A:
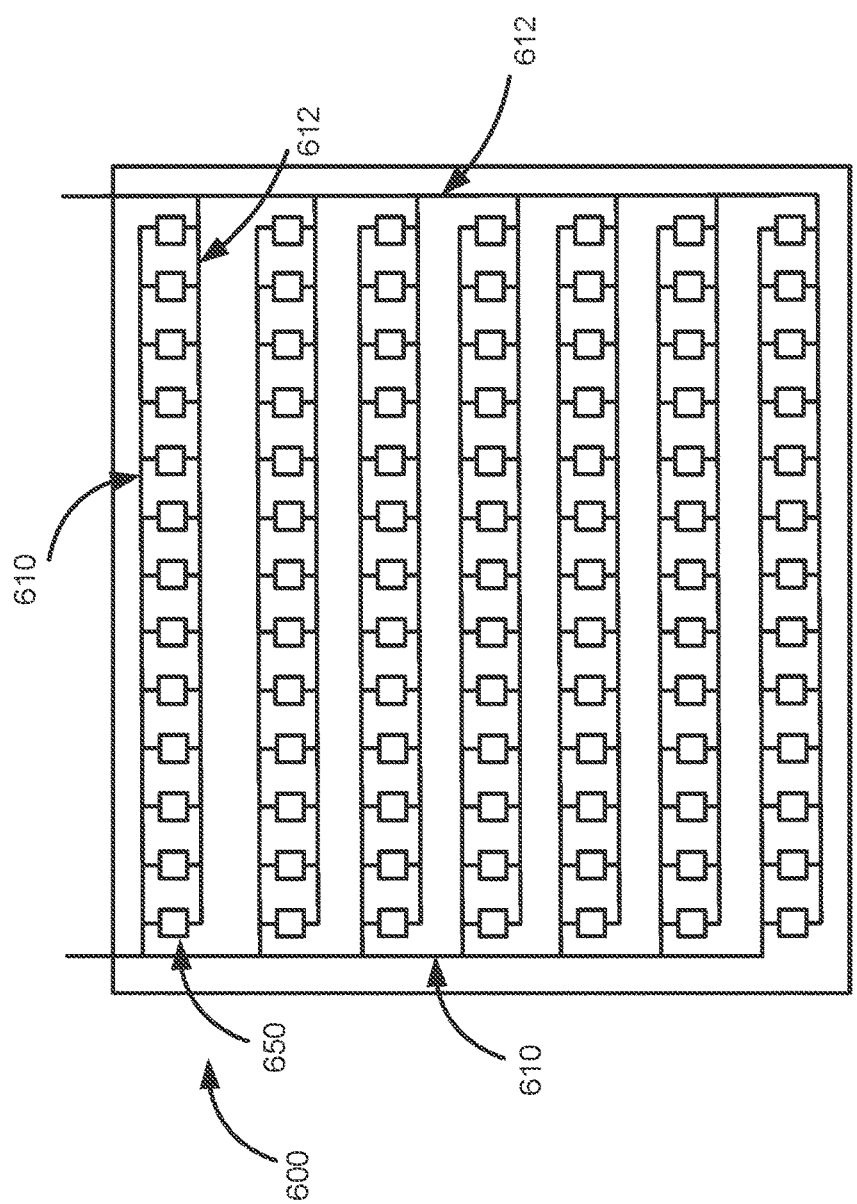
FIG. 6A illustrates a cross-sectional view of an array of electrochemical cells in accordance with the present disclosure.

With initial reference to FIG. 6A, an electrochemical array 600 can comprise a plurality of battery cells 650. In various embodiments, battery cells 650 comprise lithium ion battery cells formed in accordance with any of the previously described methods. For example, electrochemical array 600 may be formed by injecting the anode and cathode of each battery cell 650 simultaneously into plurality of molds, followed by injection of each electrolyte injected into the molds. Each battery cell 650 can be connected in parallel to each adjacent battery cell 650 via a shared cathode bus 610 and anode bus 612. In such embodiments, electrochemical array 600 comprises a plurality of battery cells 650 connected together to provide a single electrical discharge.

For example, each battery cell 650 can be electrically coupled to the cathode bus 610 and the anode bus 612.

A case may be injected around each battery cell 650 to prevent short circuiting of any of battery cells 650. The entire electrochemical array 600 can be placed into a second case. Cathode bus 610 and anode bus 612 can be formed simultaneously with the anodes and cathodes. In an embodiment, the temperature of each mold used to form each battery cell 650 is adjusted along with the cavity temperature of each mold to determine the size and depth of cathode bus 610 and anode bus 612. For example, by adjusting the mold temperature and cavity temperature, cathode conductive material and anode conductive material injected with the cathode material and the anode material may form above the area where the anode or cathode are formed, forming cathode bus 610 and/or anode bus 612. The temperatures are adjusted using heating and cooling elements such that a predetermined amount of material forms as cathode bus 610 and anode bus 612.

Figure 6B:
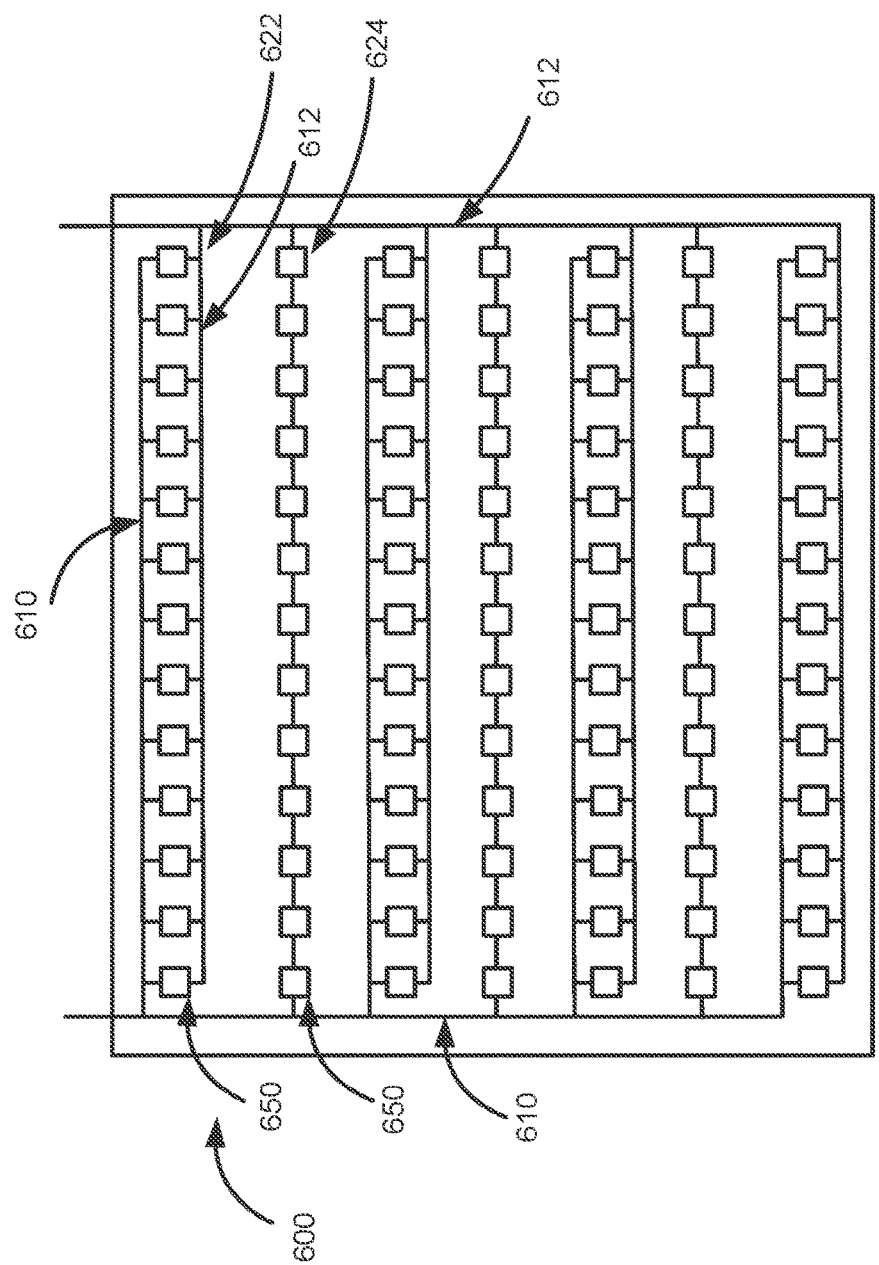
FIG. 6B illustrates a cross-sectional view of another array of electrochemical cells in accordance with the present disclosure.

With initial reference to FIG. 6B, electrochemical array 600 can comprise a plurality of battery cells 650 grouped into arrays with a first sub-array 622 having battery cells 650 connected in parallel, and a second sub-array 624 having battery cells 650 connected in series. By arranging a number of sub-arrays in parallel and a number of sub-arrays in series, the overall voltage and current output of electrochemical array 600 can be adjusted to a desired level.

Figure 6C:
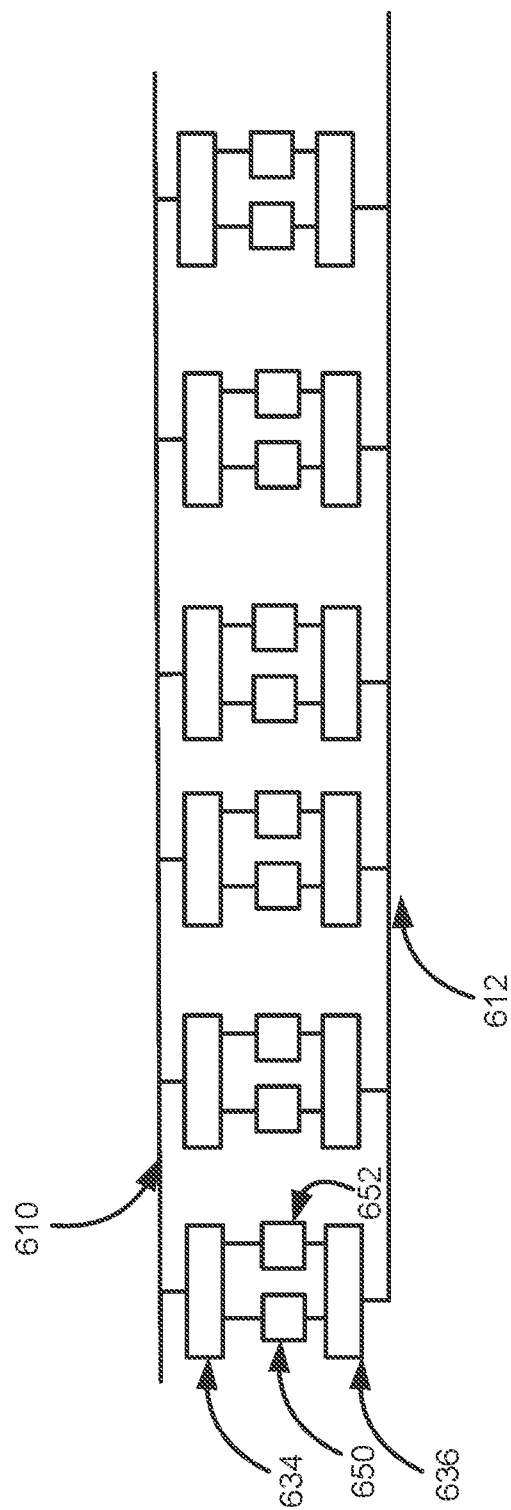
FIG. 6C illustrates a cross-sectional view of yet another array of electrochemical cells in accordance with the present disclosure.

With initial reference to FIG. 6C, electrochemical array 600 comprises a plurality of first electrochemical cells 650 and a plurality of second electrochemical cells 652. In various embodiments, each of first cells 650 and second cells 652 are connected to a cathode switch 634 and anode switch 636. Cathode switch 634 and anode switch 636 can be any suitable switch, such as a surface mounted switch. Cathode switch 634 and/or anode switch 636 can be mounted on a material formed during formation of electrochemical cells 650 and 652. A central processing unit (not shown) may monitor the current output or voltage of an individual first cell 650 and remove the first cell 650 from electrochemical array 600 should the voltage or current from the first cell 650 fall below a predetermined threshold. In various embodiments, when switches 634 and 636 remove a particular first cell 650 from the array, a corresponding second cell 652 is connected to cathode bus 610 and anode bus 612.

Figure 7A:
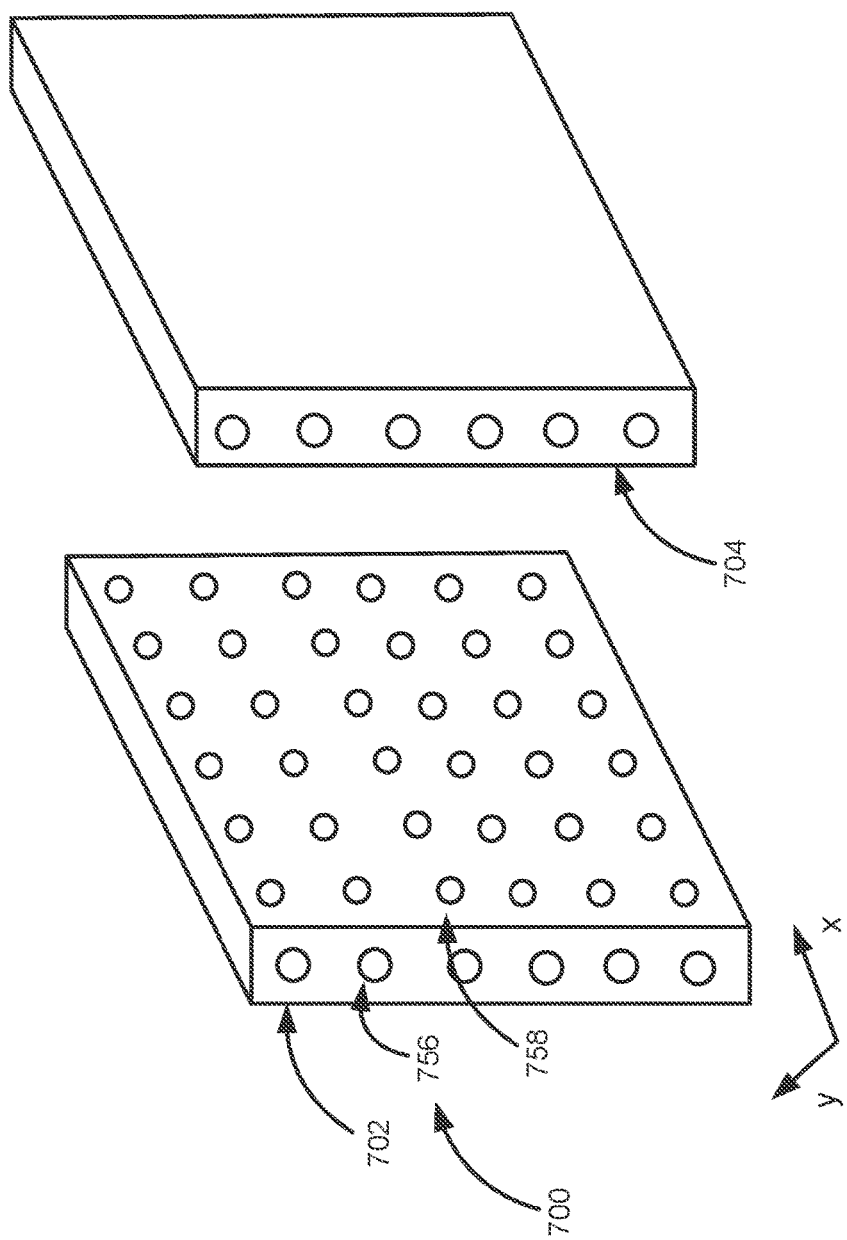
FIG. 7A illustrates a perspective view of electrodes of an electrochemical cell in accordance with the present disclosure.

With initial reference to FIG. 7A, an example electrochemical cell 700 is illustrated. Electrochemical cell 700 can comprise a cathode plate 702 and an anode plate 704. Cathode plate 702 and anode plate 704 each include a plurality of channels 756 extending along a length of anode plate 704 and cathode plate 702. For example, the plurality of channels 756 may extend through anode plate 704 and/or cathode plate 702 in the x direction, as indicated by the axes of FIG. 7A. Channels 756 are sized such that a molded wire can be formed in each channel. A plurality of openings 758 can be formed across the face of cathode plate 702 and anode plate 704, with each opening 758 being connected to a respective channel 756 in cathode plate 702 or anode plate 704 and extending in the y direction.

Figure 7B:
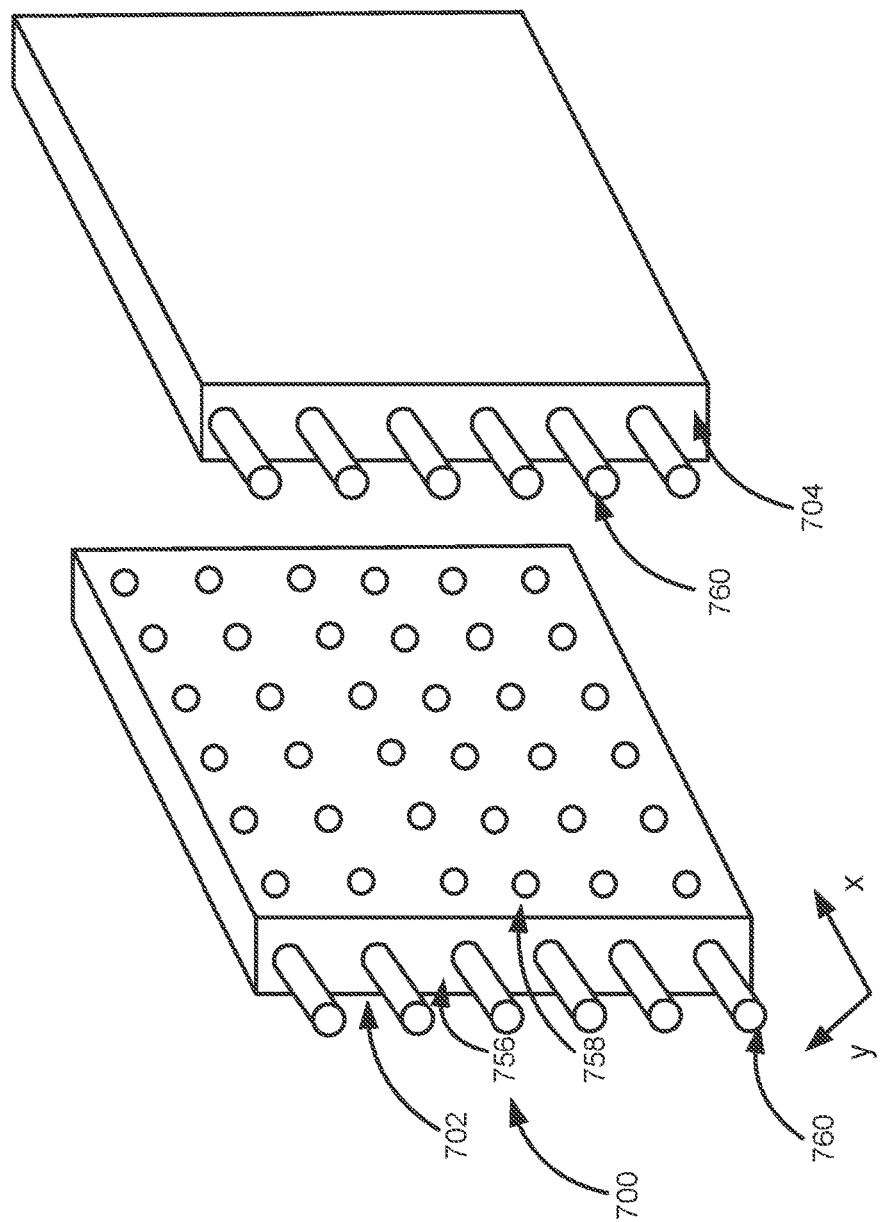
FIG. 7B illustrates a perspective view of the electrodes of FIG. 7A, in accordance with the present disclosure.

With initial reference to FIG. 7B, conductive pathways 760 are formed in channels 756. Conductive pathways 760 may be formed by injection molding a metal material into each channel 756 under pressure. An electrolyte material may be injected between cathode plate 702 and anode plate 704 after conductive pathways 760 are formed. For example, conductive pathways 760 may extend through anode plate 704 and/or cathode plate 702 in the x direction, as indicated in the axes of FIG. 7B. Each conductive pathway 760 can connect to a respective anode collector or cathode collector in the battery 700. By forming a plurality of conductive pathways 760 in anode plate 704 and cathode plate 702, the conduction of current from each cell 700 is increased.

Figure 8:
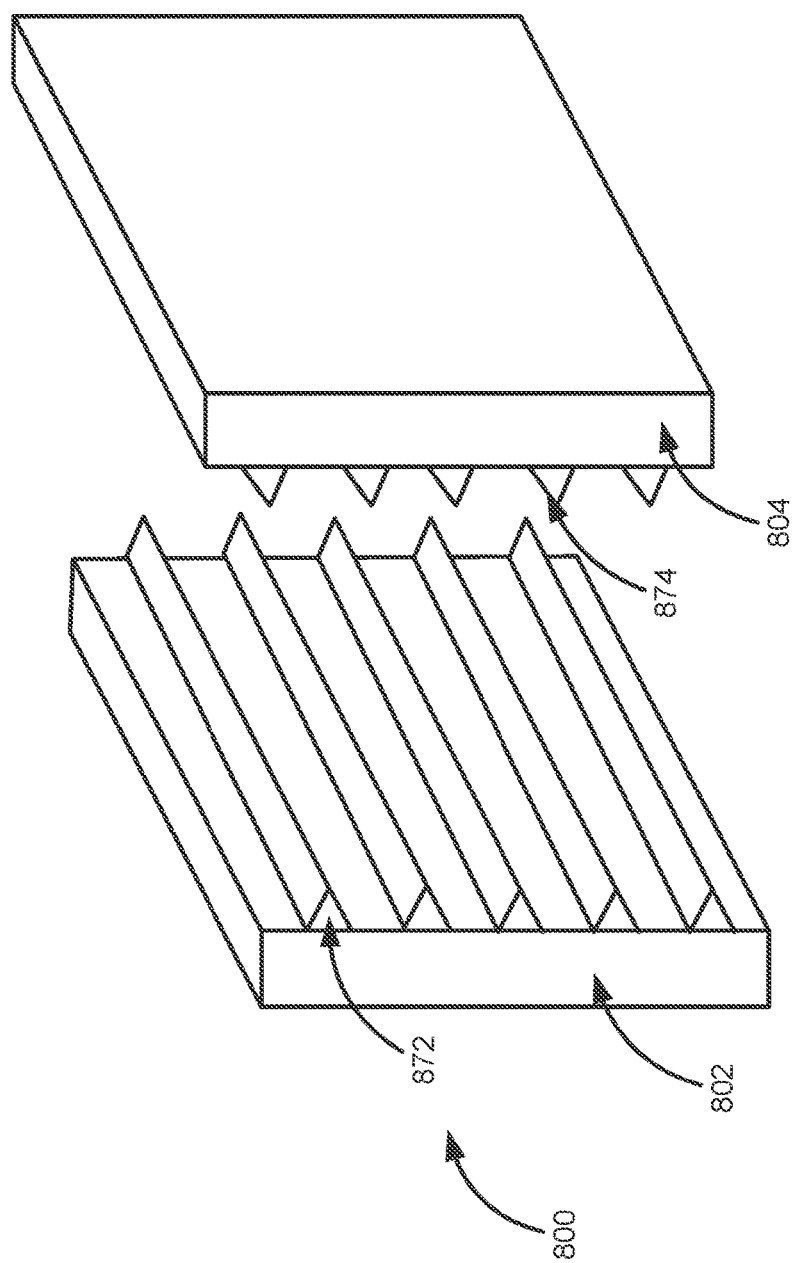
FIG. 8 illustrates a perspective view of electrodes of an electrochemical cell in accordance with the present disclosure.

With initial reference to FIG. 8, an electrochemical cell 800 is illustrated. In various embodiments, electrochemical cell 800 comprises a cathode plate 802 having a plurality of cathode ridges 872 spaced across a surface of the plate. Electrochemical cell 800 can further comprise anode plate 804 having a plurality of anode ridges 874, each of which correspond to and are offset from each of cathode ridges 872. In various embodiments, cathode plate 802 and anode plate 804 are positioned such that cathode ridges 872 are adjacent to anode ridges 874, with a space between the surface of anode plate 804 and the surface of cathode plate 802. An electrolytic material can be injected into the space between cathode plate 802 and anode plate 804. Cathode plate 802 and anode plate 804 can be formed by injecting a cathode material and an anode material into the same mold, followed by injection of an electrolyte material. A case can formed around anode plate 804 and cathode plate 802 to form a sealed battery. By injecting the anode, cathode and electrolyte material under heat (e.g., 300° F.-650° F.) and pressure to form electrochemical cell 800, the surface contact between the anode material, cathode material, and electrolytic material may be improved, and the charge density of the battery may be increased.

Figure 9A:
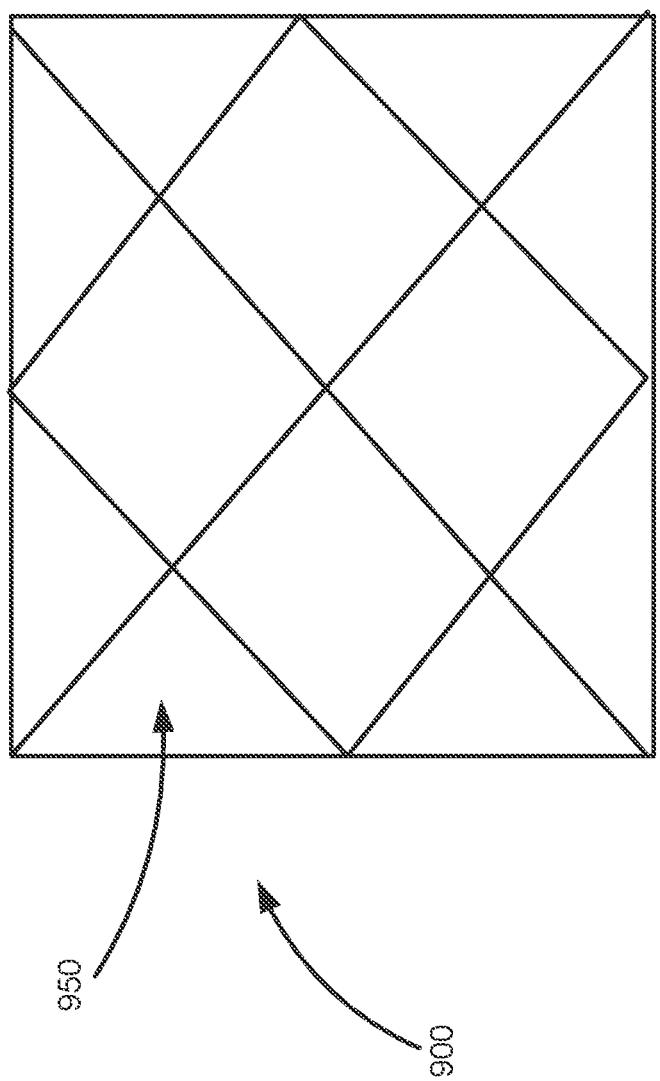
FIG. 9A illustrates a cross-sectional view of an array of electrochemical cells in accordance with the present disclosure.
Figure 9B:
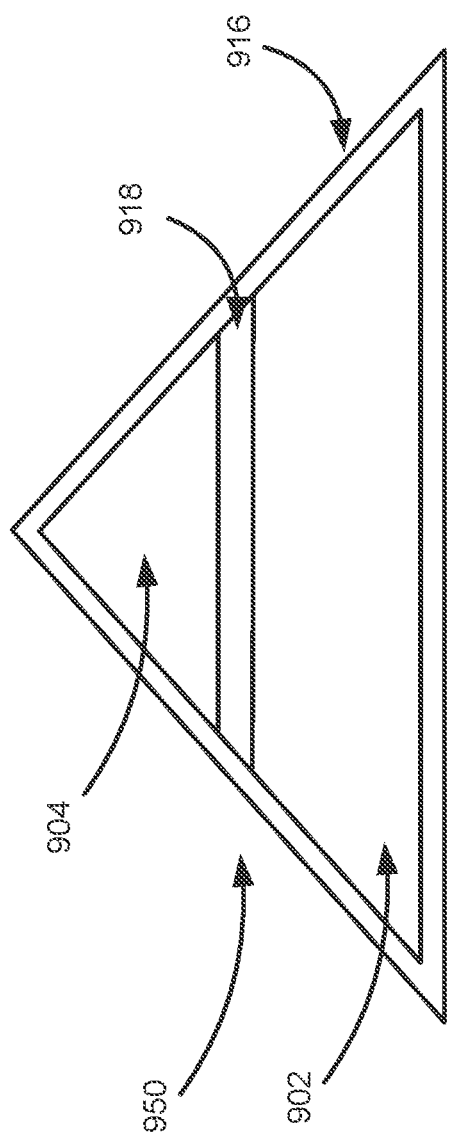
FIG. 9B illustrates a cross-sectional view of the electrochemical array of FIG. 9A, in accordance with the present disclosure.

In various embodiments, electrochemical cells of the present disclosure comprise non-rectangular geometries. With initial reference to FIG. 9A, electrochemical array 900 comprises a plurality of triangular shaped battery cells 950. With reference to FIG. 9B, each electrochemical cell 950 comprises a cathode 902, an anode 904, and an electrolyte 918. The sides of the triangular shape of each electrochemical cell 950 are formed by a case 916 surrounding anode 904, cathode 902, and electrolyte 918. In various embodiments, electrolyte 918 varies in thickness across the length of electrochemical cell 950. Electrochemical cell 950 can, for example, be formed by injecting material of the various components (anode 904, cathode 902, and electrolyte 918) into a mold under pressure, as previously described. In various embodiments, the triangular geometry may increase the structural strength of electrochemical array 900 and/or allow for more intimate nesting of individual electrochemical cells 950 to each other, thereby increasing the density of electrochemical array 900. Such configuration may provide for an electrochemical array 800 that is physically smaller than, yet provides the same or increased electrical capacity of, electrochemical arrays of conventional geometries.

Although described with reference to specific geometries (including the triangular geometries illustrated in FIGS. 9A and 9B), processes of the present disclosure may facilitate the formation of electrochemical cells having a wide variety of geometries. For example, electrochemical cells of the present disclosure can be formed having geometries including arcs, spheres, waves, tubes, trapezoids, and other non-rectangular geometries. Further, electrochemical cells in accordance with the present disclosure may comprise conforming geometries, in which the shape and configuration of the cell conforms to the shape and configuration of an independent component or device. For the purposes of this disclosure, the term "independent component" means a component that is independent from the electrochemical cell itself. Further, an independent component may be a part of a larger article. For example, electrochemical cells of the present disclosure can conform to components of smaller articles such as watch bands, hinges, latches, and/or clips, or components of articles as large as vehicles, including aircraft, automobiles, motorcycles, bicycles, buses, railed vehicles (e.g., trains), and spacecraft.

Further, electrochemical cells of the present disclosure can comprise capacitors. In various embodiments, a capacitor such as a plate capacitor can be formed via injection molding of the various components. For example, one or more conductive plates can be formed by injection molding a mixture of conductive material and resin. Further, a dielectric layer can be formed by injection molding a mixture of the same resin and a dielectric material. In other embodiments, injection molded conductive plates can be used in conjunction with non-polymeric (e.g., ceramic, paper, glass) dielectric materials.

Although described with reference to molding and, specifically, injection molding, other methods of forming electrochemical cells, including additive manufacturing/three-dimensional (3D) printing techniques, are within the scope of the present disclosure.

For example, an electrochemical cell (such as, for example, electrochemical cell 100) can be formed using a 3D printing technique such as, for example, fused filament fabrication (also referred to as Fused Deposition Modeling, registered to Stratasys, Inc.). In various embodiments, components of electrochemical cell 100, including anode 104, cathode 102, and/or electrolyte 118, among others, can be formed using fused filament fabrication. For example, one or more components can be formed by using fused filament fabrication to form the components inside of a pre-formed housing 116. In other embodiments, one or more components can be formed independently of housing 116 using fused filament fabrication, then placed in their respective position within housing 116 to form electrochemical cell 100.

In various embodiments, a component of electrochemical cell 100 (for example, cathode 102) can be formed from a mixed-material filament, the composition of which corresponds to the desired composition of the component. For example, cathode 102 can be formed by a 3D printing technique which deposits a filament comprising a cathode material (such as, for example, a suitable binder resin), a cathode conductive material, and a cathode active material. Such filaments can, for example, be formed by mixing a powder or particulate form of the cathode conductive material (and cathode active material, if required) with a suitable binder resin and forming a filament for use in a 3D printer. Suitable binder resins include, for example, nylon, polyethylene, acrylonitrile butadiene styrene (ABS), polylactic acid (PLA), polycarbonate, polyamide, and polystyrene, among others.

Similarly, anode 104 can be formed from a filament comprising an anode material (e.g., a thermoplastic resin), and an anode conductive material (such as, for example, carbon nanotubes). Further, electrolyte 118 can be formed from a filament comprising an electrolyte material (e.g., a thermoplastic resin), and an electrolytic material. Any combination of methods for forming components of electrochemical cell 100, including combinations of additive manufacturing and injection molding, is within the scope of the present disclosure.

In various embodiments, other components of the electrochemical cell, such as cathode bus 110, cathode current collector 106, anode bus 112, and/or anode current collector 108 are formed by 3D printing using mixed-material filaments. For example, one or more of cathode bus 110, cathode current collector 106, anode bus 112, and anode current collector 108 can be formed from a mixed-material filament comprising a binder resin and a metallic additive. In various embodiments, the metallic additive can comprise at least one of copper, iron, aluminum, nickel, silver, zinc, gold, and palladium.

EXAMPLE

An electrochemical cell having a single anode, single cathode, and single electrolyte will be formed. The cathode will be made by mixing polyethylene oxide with flakes of $LiCoO_2$ (approximately 60% by volume) and graphite (approximately 20% by volume) and injecting the material into a cavity of a polypropylene housing. The anode will be made by mixing polyethylene oxide with carbon nanotubes (wherein the polyethylene oxide comprises approximately 20% by volume) and injecting the material into a cavity of the same housing. The carbon nanotubes will have an average diameter of $10^{-9}$ meters, an average length of 1.5 micrometers, and a carbon purity of approximately 90%. The cathode current collector and cathode bus will be made by mixing copper with polyethylene oxide and injecting the material into a channel within the cathode. The anode current collector and anode bus will be made by mixing copper with polyethylene oxide and injecting the material into a channel within the anode. The separators will be formed by injecting polyethylene oxide into the housing in a cavity around the outer surface of the anode and cathode. An opening will be formed within the separator that allowed for fluid communication into the cavity between the anode and the cathode. The electrolyte will be made by mixing polyethylene oxide with $LiBF_4$ (approximately 25% by volume) and injecting the material through the opening in the separator and into the cavity between the cathode and anode. A case will be formed by injecting polypropylene around the outer surface of the cathode bus and the anode bus.

The present disclosure includes methods for forming an electrochemical cell comprising injecting a mixture of a cathode material and a cathode conductive material into a first cavity of a mold under heat and pressure to form a first cathode, injecting a mixture of an anode material and an anode conductive material into a second cavity of the mold under heat and pressure to form a first anode, injecting a mixture of an electrolyte material and an electrolytic material between the first anode and the first cathode under heat and pressure to form a first electrolyte, wherein the first electrolyte is in contact with the first cathode and the first anode, and forming a case surrounding at least a portion of the first cathode, first anode, and first electrolyte. The method can further comprise at least one of the steps of forming a second cathode and forming a second anode. The first anode can be positioned between the first cathode and the second cathode. The cathode material and the anode material can comprise at least one of styrene butadiene copolymer, polyvinylidene fluoride, polyurethane, polyvinylchloride, high density poly ethylene, polymethyl methacrylate, ethylene vinyl acetate, polyethylene oxide, low density polyethylene, and linear low density polyethylene. The cathode conductive material can comprise at least one of a metallic powder, a metallic flake, a metallic ribbon, a metallic fiber, a metallic wire, and a metallic nanotube, and can comprise between about 50 and 70 percent by volume. Further, the cathode conductive material can comprise a combination of lithium and at least one of cobalt, manganese, nickel-cobalt-manganese, and phosphate. The anode conductive material can comprise at least one of a graphite powder, a graphite fiber, and a carbon nanotube, and may be between about 75 and 85 percent by volume of the first anode. The electrolyte can comprise at least one of $LiBF_4$, $LiBF_6$, LSPS, $LiCoO_2$, $LiOHH_2O$, $Li_2CO_3$, and LiOH. The case can comprise a non-conductive thermoplastic material.

In the present disclosure, the words "a" or "an" are to be taken to include both the singular and the plural. Conversely, any reference to plural items shall include, where appropriate, the singular.

Numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size, and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

We claim:

1. An electrochemical cell comprising:
   a first cathode comprising a cathode conductive material and a cathode active material injection molded in a binder resin, wherein the cathode conductive material comprises between 50 and 70 percent by volume of the first cathode;
   a first anode comprising an anode conductive material injection molded in the binder resin, wherein the anode conductive material comprises between 75 and 85 percent by volume of the first anode;
   a first electrolyte positioned between and in contact with the first cathode and the first anode and comprising an electrolytic material injection molded in the binder resin, wherein the first electrolyte and the first cathode are fused together, and wherein the first electrolyte and the first anode are fused together; and
   a case surrounding at least a portion of the first cathode, a portion of the first anode, and a portion of the first electrolyte.

2. The electrochemical cell of claim 1, wherein the cathode conductive material comprises at least one of metallic powder, a metallic flake, a metallic ribbon, a metallic fiber, a metallic wire, and a carbon nanotube.

3. The electrochemical cell of claim 1, wherein the cathode conductive material comprises lithium and at least one of cobalt, manganese, nickel-cobalt-manganese, and phosphate.

4. The electrochemical cell of claim 1, wherein the binder resin comprises at least one of styrene butadiene copolymer, polyvinylidene fluoride, polyurethane, polyvinylchloride, high density poly ethylene, polymethyl methacrylate, ethylene vinyl acetate, polyethylene oxide, low density polyethylene, and linear low density polyethylene.

5. The electrochemical cell of claim 1, wherein the cathode conductive material comprises at least one of a wire, a fiber, and a ribbon, and wherein the cathode conductive material comprises a diameter of between about 0.001 inch and about 0.2 inch and a length of between about 0.01 inch and about 0.15 inch.

6. The electrochemical cell of claim 1, wherein the anode conductive material comprises a carbon nanotube having a diameter of approximately $10^{-9}$ meters and an average length of approximately 1.5 micrometers.

7. The electrochemical cell of claim 1, wherein the electrolytic material comprises at least one of LiBF4, LiBF6, LSPS, LiCoO2, LiOHH2O, Li2CO3, and LiOH.

8. The electrochemical cell of claim 1, further comprising a cathode bus and a cathode current collector injection molded in the first cathode, wherein the cathode bus and the cathode current collector are fused together, and an anode bus and an anode current collector injection molded in the first anode, and wherein the anode bus and the anode current collector are fused together.

9. The electrochemical cell of claim 1, wherein the cathode conductive material comprises a carbon nanotube.

10. The electrochemical cell of claim 1, wherein the cathode conductive material comprises at least one of a non-straight metallic ribbon, a non-straight metallic fiber, a non-straight metallic wire, and a non-straight carbon nanotube.

11. The electrochemical cell of claim 1, wherein the first anode, the first cathode, and the first electrolyte are boundary-less.

12. The electrochemical cell of claim 1, wherein the cathode further comprises a conductive element, the cathode conductive material being injection molded around the conductive element.

* * * * *